United States Patent [19]
Cole

[11] Patent Number: 4,607,486
[45] Date of Patent: Aug. 26, 1986

[54] CENTRIFUGAL MAIN FUEL PUMP

[75] Inventor: Edward F. Cole, Glastonbury, Conn.

[73] Assignee: United Technologies Corporation, Hartford, Conn.

[21] Appl. No.: 557,557

[22] Filed: Dec. 2, 1983

[51] Int. Cl.[4] .......................................... F02C 7/236
[52] U.S. Cl. ................................. 60/734; 417/203; 417/248
[58] Field of Search ............... 60/39.281, 734; 417/203, 248

[56] References Cited

U.S. PATENT DOCUMENTS

| | | | |
|---|---|---|---|
| 2,916,875 | 12/1959 | Morley et al. | 60/39.281 |
| 3,442,218 | 5/1969 | Wess | 60/39.281 |
| 3,475,909 | 11/1969 | Warne | 60/39.281 |
| 3,486,458 | 12/1969 | Tyler | 60/39.281 |
| 3,589,836 | 6/1971 | Danker | 417/248 |
| 3,614,269 | 10/1971 | Lanctot | 417/248 |

Primary Examiner—Louis J. Casaregola
Attorney, Agent, or Firm—Norman Friedland

[57] ABSTRACT

A high speed centrifugal fuel pump delivers fuel to the main metering valve of a fuel control of a gas turbine engine for feeding the engine's burners, and a boost pump and positive displacement pump pressurize fuel for the servo medium for actuating the various valves and engine geometry actuators. The boost pump also assures that the vapor/liquid flow relationship satisfies the engine's requirements.

2 Claims, 1 Drawing Figure

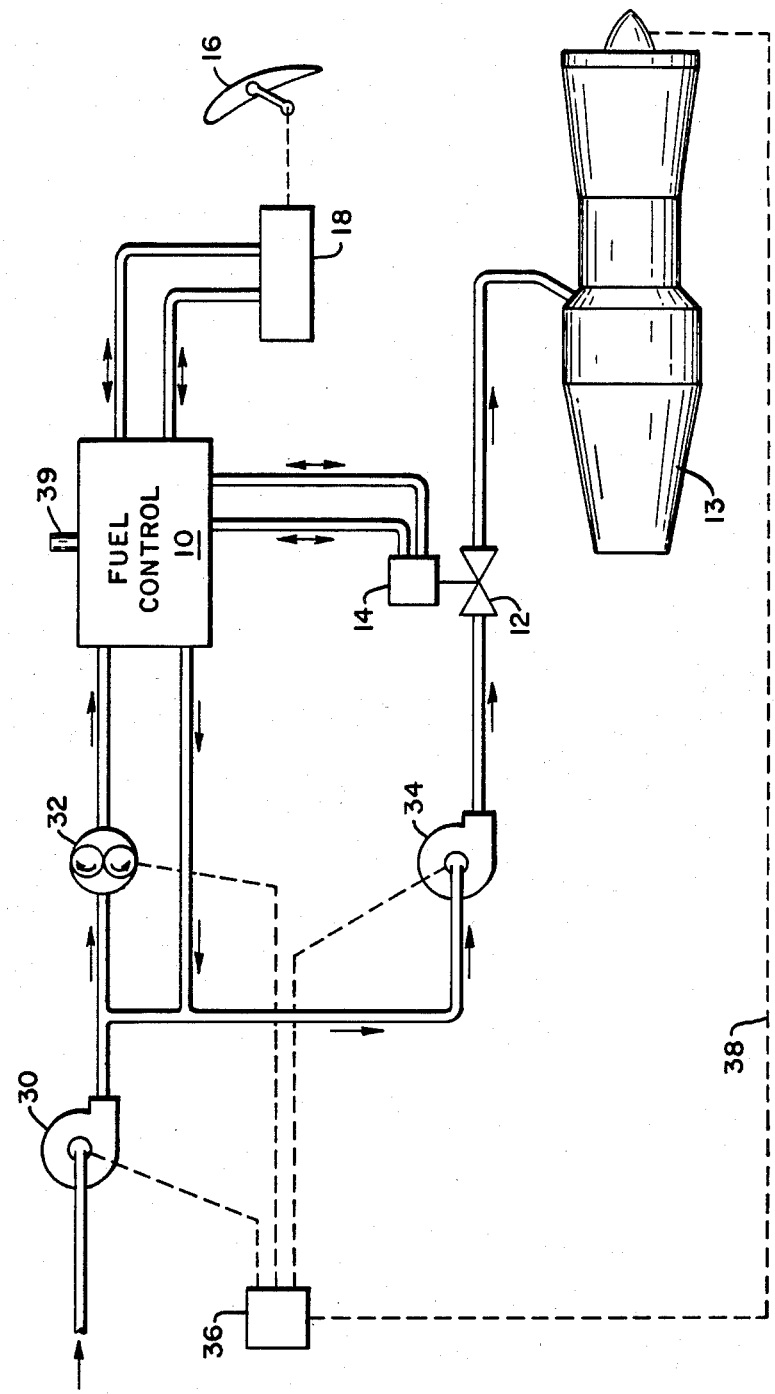

CENTRIFUGAL MAIN FUEL PUMP

TECHNICAL FIELD

This invention relates to gas turbine power plants and particularly to the fuel pumping system.

BACKGROUND ART

As is well known in the gas turbine engine art it is typical for the aircraft fuel pumping system to utilize a centrifugal boost stage and a high pressure gear stage, mounted in series flow relationship, so as to supply fuel to the fuel metering control and to the engine variable geometry actuators. Another typical aircraft installation would include two separate pumps, operating in parallel flow relationship, to supply fuel separately to the fuel metering control and to the variable geometry actuator.

It is also well known that centrifugal pumps afford improvements over the well known positive displacement types insofar as they are lighter in weight, smaller in size for the same flow capacity and more durable. They are also capable of operating dry in the event the system being supplied with fuel is inoperative. As for example, such pumps have heretofore been utilized with augmentors or afterburners sometimes used on military aircraft.

However, whenever centrifugal pumps have been utilized to supply the main engine fuel flow, a positive displacement stage, notably a gear or vane type, has been incorporated inasmuch as the centrifugal pump cannot provide sufficient pressure at the start-up mode to operate the fuel control. Thus, a typical installation would deactivate the positive displacement stage as soon as the engine was up to sufficient speed, say idle, to operate the centrifugal pump. Hence, the vane or gear pump would be decoupled and would remain inoperative until the next engine start or restart cycle. In some installations the decoupling would be a clutch arrangement and in others it would be a vane retraction system, or the like. Whether the one or other is being employed, such systems are not only complex but generally contribute to the overall weight of the pumping system.

This invention addresses two significant problems associated with the high speed centrifugal pump, which are namely (1) The high speed centrifugal stage is less able to accommodate the two-phase vapor/liquid (V/L) flow which results when dissolved air is released into the fuel upstream of the pump inlet, as can occur during aircraft climb operation; and, (2) The centrifugal stage cannot generate sufficient pressure at engine cranking speeds to satisfy the requirements of the fuel metering control and variable geometry actuator, necessitating the incorporation of a positive-displacement type starting stage and an automatic disengagement mechanism. The positive-displacement stage is also necessary to provide a dry lift capability to enable the pump to reprime itself after any inadvertent fuel mismanagement incident. The starting stage must be large enough to provide full starting flow, adding to the weight of the pump, and the automatic disengagement mechanism reduces overall pump reliability.

In accordance with this invention the fuel pump system comprises a high-speed centrifugal main stage to supply fuel to the fuel metering control, a small gear-type hydraulic stage to supply fuel to the engine variable geometry actuator and to the fuel metering control servos, and a low-speed centrifugal stage to supply boost pressure to the centrifugal main stage and the gear hydraulic stage.

The use of the centrifugal pump in the concept as described herein overcomes the following shortcomings of the heretofore known pumps:

1. The high-speed centrifugal main stage retains the weight and durability advantages inherent with this configuration, but is now capable of providing engine starting fuel flow as well, since it is not required to provide the high pressure necessary to power the fuel metering control servos and engine variable geometry actuator(s).

2. The low-speed centrifugal boost stage provides sufficient additional two-phase flow handling capability to satisfy installed engine V/L requirements. Because the high-speed centrifugal stage can accommodate a modest V/L condition by itself, the low-speed centrifugal boost stage is smaller than that required for a conventional gear pump.

3. The gear hydraulic stage provides the high fuel pressures necessary to power the fuel metering control servos and the engine variable geometry actuator(s); however, because the flow required for these purposes is less than that required for the engine burners, this stage is smaller and lighter than the positive-displacement type stage that would otherwise be required for engine starting. The hydraulic stage also provides the dry lift capability required for fuel system repriming, by means of a vent valve provided either in the pump or in the downstream metering or actuating control system.

Inasmuch as the pumping system of this invention utilizes the high speed centrifugal pump solely for the main fuel metering system the centrifugal boost stage and the gear hydraulic stage operate at lower speeds than that of the high-speed centrifugal main stage. The gearing necessary to drive the three stages at the required speeds can be located either in the engine gearbox or in a combined pump assembly. If the gearing is located within the pump assembly, it may be lubricated either with engine oil from the gearbox, or with fuel passing through the pump.

DISCLOSURE OF INVENTION

An object of this invention is to provide an improved fuel pumping system for a gas turbine power plant powering aircraft. A feature of this invention is the utilization of a high speed centrifugal fuel pump directly supplying the fuel to the fuel metering valve or valves that feed the engine's burners. The fuel pressure required to actuate the fuel metering and the variable geometry actuators is provided by a positive displacement pump rather than the high speed centrifugal pump supplying the fuel to the burners. A still further feature of this invention is to utilize a low speed centrifugal pump as a boost stage to provide additional two-phase flow handling capabilities to satisfy the engine's vapor/liquid requirements.

Other features and advantages will be apparent from the specification and claims and from the accompanying drawings which illustrate an embodiment of the invention.

BRIEF DESCRIPTION OF DRAWINGS

The sole FIGURE is a schematic illustration showing a preliminary flow circuit embodying this invention.

BEST MODE FOR CARRYING OUT THE INVENTION

As shown in the sole FIGURE, the fuel pumping system is primarily used to supply fuel to the engine's burners and servo pressure to actuate the variable geometry of the engine and the servo powered valves. For an example of details of such a system reference should be made to the various engine models, like the JT8D, JT9D, PWA2037 engines manufactured by Pratt & Whitney Aircraft and the various fuel control models like the JFC-60, JFC-68, JFC-104 manufactured by Hamilton Standard, both divisions of United Technologies Corporation, the assignee of this patent application.

For the sake of convenience and simplicity only those details necessary for an understanding of this invention is disclosed herein. Suffice it to say that the fuel control shown in the box indicated by reference numeral 10 serves to monitor certain engine operating parameters and through a complex calculating system, either electronic or hydromechanical meters fuel to the burner (not shown) in engine 13 to achieve efficient engine operation and prevent engine surge and over temperature conditions. The metering valve schematically shown by reference numeral 12 is typically servoed and requires servo pressure as indicated by actuator 14 from the pressurized fuel system. Additionally, as indicated schematically by the airfoil 16, the fuel control serves to adjust the variable engine geometry, such as variable stator vanes, variable exhaust nozzles and the like, with servoed actuators as indicated also by reference numeral 18 requiring pressurized fluid.

According to this invention, the fuel pumping system for the fuel control that serves to meter fuel to the engine's burners and fuel for pressurizing the servo fluid for actuating the fuel control valves and variable geometry actuators comprises the centrifugal boost fuel pump 30, gear pump 32 and high speed centrifugal fuel pump 34. Each of the pumps are shown to be driven by a gearbox inicated by the blank box 36 which may be powered off of the engine schematically shown by the dash line 38 or individually driven by electric motors and the like.

Inasmuch as the only function of the high speed centrifugal pump 34 is to feed the burner via valve 12, it isn't necessary for it to generate the same pressure that would otherwise be required when the main fuel pump also supplies the servo pressure. In the heretofore system a minimum pressure and shut-off valve would typically be employed so as to generate sufficient pressure in the system to operate the servos prior to being delivered to the burners. By virtue of this invention the main pump 34 would only have to generate say 25 pounds per square inch (PSI) in addition to sump pressure under engine startup conditions in contrast to other systems that require 135–300 PSI over sump pressure.

As is apparent from the foregoing the main high speed centifugal pump 34 sufficient pressure and flow to satisfy the starting of the engine since it doesn't have to satisfy the pressure requirements of the servos and variable geometry actuator. The gear stage provides the necessary pressure to operate the servos and variable geometry actuator. Inasmuch as the gear pump does not have to supply the quantity of flow necessary to meet the burner requirements, it can be smaller and lighter than heretofore positive-displacement types that would otherwise be required for engine starting. This gear stage pump provides the dry lift capability for fuel repriming by the vent 39, which are well known techniques.

The low speed centrifugal boost pump 32 augments the installed engine V/L requirement provided by the main pump 34 so that both together satisfies this requirement.

Hence, what has been shown is a system that provides the following functions:

(1) meters fuel flow from the main stage to the engine burner;

(2) controls engine variable geometry actuators;

(3) controls pressure rise across the gear pump to accomplish the above;

(4) bypasses excess flow from the gear stage back to gear stage inlet;

(5) vents air from gear stage discharge in order to reprime the pump, when required.

It differs from currently used controls in that the fuel pressure required to actuate the fuel metering valve, as well as that required to power the variable geometry actuators, is provided by the hydraulic gear stage, rather than by the main pump stage which supplies the fuel being metered to the engine burners. This reduces the pressure levels which the main stage is required to develop, particularly at engine starting, enabling a centrifugal stage to provide engine starting fuel flow.

It should be understood that the invention is not limited to the particular embodiments shown and described herein, but that various changes and modifications may be made without departing from the spirit and scope of this novel concept as defined by the following claims.

I claim:

1. For a gas turbine power plant having a fuel supply and a fuel metering valve and variable geometry for the power plant including servo actuating mechanisms for said fuel metering valve and variable geometry, a fuel pumping system to supply pressurized fuel for the servo actuating mechanisms and for the engine working fluid medium, said pumping system including a centrifugal pump solely supplying the fuel to said fuel metering valve to be delivered to the power plant for its working fluid medium, a positive displacement pump in parallel with said centrifugal pump and solely to supply pressurized fuel to said servo actuating mechanisms for the fuel metering valve and for the variable geometry, and a boost pump means disposed in serial relationship with said positive displacement pump and said centrifugal pump for augmenting the pressure supplied by the positive displacement pump and the centrifugal pump during predetermined operating conditions of said power plant whereby the combined boost pump and centrifugal pump capability is sufficient to satisfy the vapor to liquid ratio requirements of said power plant during its entire operating envelope.

2. For a gas turbine power plant as in claim 1 wherein said boost pump is another centrifugal pump and the rotational speed of said centrifugal pump is higher than the rotational speed of said other centrifugal pump.

* * * * *